(12) United States Patent
Kim et al.

(10) Patent No.: US 9,118,804 B2
(45) Date of Patent: Aug. 25, 2015

(54) ELECTRONIC DEVICE AND SERVER, AND METHODS OF CONTROLLING THE ELECTRONIC DEVICE AND SERVER

(75) Inventors: Kyunghwan Kim, Seoul (KR); Hanyoung Ko, Seoul (KR); Joomin Kim, Seoul (KR); Sungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 13/541,869

(22) Filed: Jul. 5, 2012

(65) Prior Publication Data

US 2013/0083154 A1 Apr. 4, 2013

Related U.S. Application Data

(60) Provisional application No. 61/541,289, filed on Sep. 30, 2011.

(51) Int. Cl.
*H04N 7/14* (2006.01)
*H04N 7/15* (2006.01)
*H04L 29/06* (2006.01)

(52) U.S. Cl.
CPC .............. *H04N 7/15* (2013.01); *H04L 65/1069* (2013.01); *H04L 65/4053* (2013.01); *H04N 7/147* (2013.01)

(58) Field of Classification Search
USPC ............ 348/14.01, 14.03, 14.07, 14.1, 14.15, 348/14.16, 14.08
See application file for complete search history.

(56) References Cited

U.S. PATENT DOCUMENTS

| | | | |
|---|---|---|---|
| 6,278,479 B1 * | 8/2001 | Wilson et al. | 348/47 |
| 7,227,566 B2 * | 6/2007 | Abe et al. | 348/14.05 |
| 7,475,112 B2 * | 1/2009 | Sinclair et al. | 709/204 |
| 8,111,282 B2 | 2/2012 | Cutler et al. | |
| 8,311,200 B2 * | 11/2012 | Kang | 379/202.01 |
| 2005/0054352 A1 * | 3/2005 | Karaizman | 455/456.3 |
| 2005/0102502 A1 * | 5/2005 | Sagen | 713/156 |
| 2007/0188597 A1 * | 8/2007 | Kenoyer | 348/14.08 |
| 2008/0088698 A1 * | 4/2008 | Patel et al. | 348/14.09 |
| 2008/0123747 A1 | 5/2008 | Lee et al. | |
| 2009/0089055 A1 | 4/2009 | Caspi et al. | |
| 2010/0027958 A1 | 2/2010 | Ubillos | |
| 2010/0085415 A1 * | 4/2010 | Rahman | 348/14.08 |
| 2010/0149305 A1 * | 6/2010 | Catchpole et al. | 348/14.08 |

(Continued)

FOREIGN PATENT DOCUMENTS

WO WO2005048600 A1 5/2005

OTHER PUBLICATIONS

Non-final Office Action dated May 15, 2014 from U.S. Appl. No. 13/417,375, 10 pages.

(Continued)

*Primary Examiner* — Olisa Anwah
(74) *Attorney, Agent, or Firm* — Fish & Richardson P.C.

(57) ABSTRACT

An electronic device is provided including a communication unit configured to receive audio/video data (A/V data) streamed from a first electronic device, a display unit configured to display the video data of the A/V data, and a controller configured to obtain shape feature information of a first real object included in the video data, to determine whether there is first personal information of the first real object based on the shape feature information, and to display a first virtual object including the first personal information on the display unit in association with the first real object when there is the first personal information.

16 Claims, 13 Drawing Sheets

(56) References Cited

U.S. PATENT DOCUMENTS

| | | |
|---|---|---|
| 2010/0321469 A1 | 12/2010 | Jeong et al. |
| 2011/0019014 A1 | 1/2011 | Oh et al. |
| 2011/0096135 A1* | 4/2011 | Hegde et al. ............... 348/14.07 |
| 2012/0293599 A1* | 11/2012 | Norlin et al. ............... 348/14.01 |
| 2012/0327110 A1 | 12/2012 | Kang et al. |
| 2013/0051471 A1 | 2/2013 | Ahn et al. |
| 2013/0239062 A1 | 9/2013 | Ubillos et al. |
| 2013/0328925 A1* | 12/2013 | Latta et al. ................... 345/633 |

OTHER PUBLICATIONS

Notice of Allowance dated Jun. 24, 2014 from U.S. Appl. No. 13/424,507, 9 pages.

Final Office Action dated Dec. 11, 2014 from U.S. Appl. No. 13/417,375, 12 pages.

* cited by examiner

FIG.3
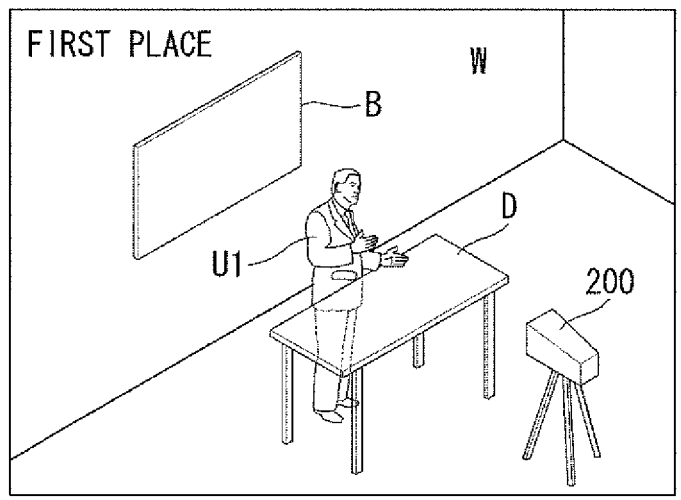
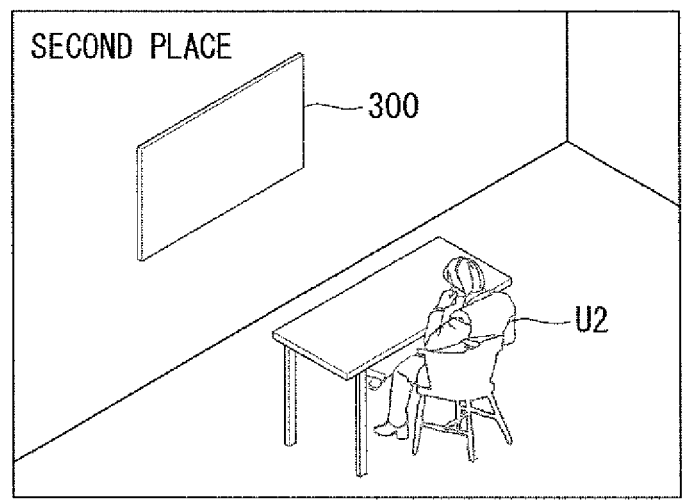

| NAME | DEPARTMENT | TITLE | PHONE NUMBER | e-mail | SHAPE FEATURE INFORMATION |
|---|---|---|---|---|---|
| Mike | XXX | Manager | AAA-BBB-CCC | mike@xxx.com | FI1 |
| Sharon | YYY | Assistant | DDD-EEE-FFF | sharon@yyy.com | FI2 |
| Darron | ZZZ | Director | GGG-HHH-III | Darron@zzz.com | FI3 |
| ⋮ | ⋮ | ⋮ | ⋮ | ⋮ | ⋮ |

FIG.11
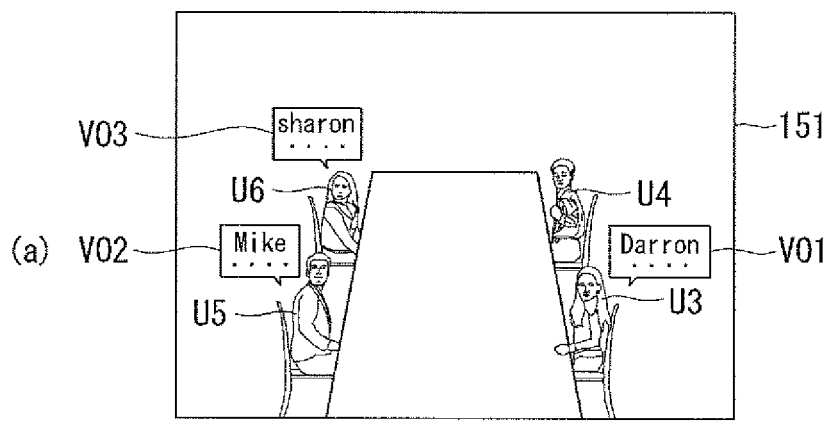
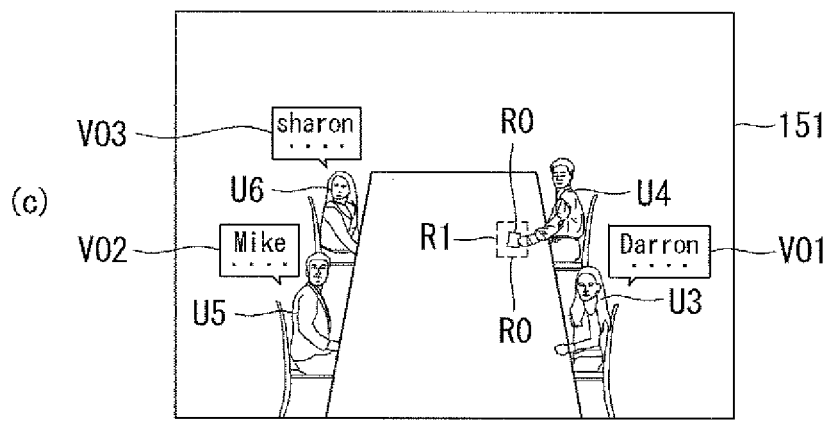
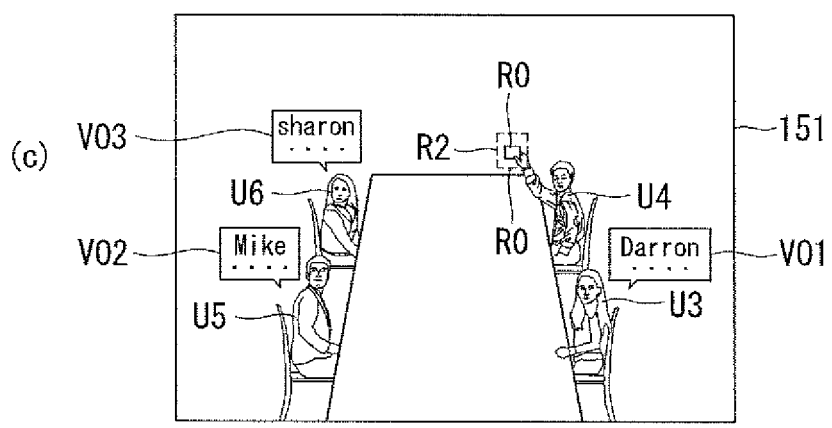

| NAME | DEPARTMENT | TITLE | PHONE NUMBER | e-mail | SHAPE FEATURE INFORMATION |
|------|------------|-------|--------------|--------|---------------------------|
| Mike | XXX | Manager | AAA-BBB-CCC | mike@xxx.com | F11 |
| Sharon | YYY | Assistant | DDD-EEE-FFF | sharon@yyy.com | F12 |
| Darron | ZZZ | Director | GGG-HHH-III | Darron@zzz.com | F13 |
| Steve | RRR | CEO | JJJ-KKK-LLL | steve@RRR.com | F14 |
| ⋮ | ⋮ | ⋮ | ⋮ | ⋮ | ⋮ |

ELECTRONIC DEVICE AND SERVER, AND METHODS OF CONTROLLING THE ELECTRONIC DEVICE AND SERVER

CROSS-REFERENCE TO RELATED APPLICATION

This application claims priority to U.S. Provisional Application No. 61/541,289, filed on Sep. 30, 2011, the contents of which are herein incorporated by reference in its entirety.

TECHNICAL FIELD

Embodiments of the present invention are directed to electronic devices, servers, and methods of controlling the electronic devices and servers, and more specifically to electronic devices, servers, and control methods of the electronic devices and servers, which can be used for remote video conferences.

DISCUSSION OF RELATED ART

Tele-presence refers to a set of technologies which allow a person to feel as if they were present. Tele-presence technologies reproduce information on five senses a person feels in a specific space at a remote location. Element technologies for tele-presence may include video, audio, tactile, and network transmission technologies. Such tele-presence technologies are adopted for video conference systems. Tele-presence-based video conference systems provide higher-quality communications and allow users to further concentrate on the conversation compared to conventional video conference systems.

The tele-presence technologies for video conference systems, although showing a little difference for each and every manufacturer, may be applicable to video, audio, and network transmission technologies as follows:

For video technologies, the tele-presence technologies apply as generating natural eye-contact images for being able to make a user further feel like he would face another user and generating high-resolution images. For audio technologies, the tele-presence technologies apply as audio playback technologies that may create a feeling of a space based on a speaker's location. For network transmission technologies, the tele-presence technologies apply as real-time image/sound transmission technologies based on an MCU (Multi Control Unit).

In contrast to video, audio, and network transmission for video conference systems which have been actively researched, data sharing between attendants in a conference is still not satisfactory. Current video conference systems use a separate monitor for data sharing. Accordingly, when a user shifts his eyes from an image screen to a data screen, the eye contact is not maintained lowering a feeling as if actually facing another user. Moreover, a short drop in conversation occurs at every data manipulation because the data manipulation is conducted by a peripheral device, such as a mouse.

SUMMARY

Embodiments of the present invention provide an electronic device, a server, and methods of controlling the electronic device and the server, which may allow for a vivid video conference.

According to an embodiment of the present invention, there is provided an electronic device including a communication unit configured to receive audio/video data (A/V data) streamed from a first electronic device, a display unit configured to display the video data of the A/V data, and a controller configured to obtain shape feature information of a first real object included in the video data, to determine whether there is first personal information of the first real object based on the shape feature information, and to display a first virtual object including the first personal information on the display unit in association with the first real object when there is the first personal information.

The shape feature information includes face feature information.

The controller is configured to analyze the A/V data and to obtain second personal information of the first real object when there is no first personal information and to display a second virtual object including the second personal information on the display unit in association with the first real object.

The controller is configured to recognize a shape of a second real object associated with a movement of the first real object and to obtain the second personal information based on the recognized shape.

The controller is configured to recognize a shape of a second real object positioned to satisfy a predetermined distance condition with the first real object and to obtain the second personal information based on the recognized shape.

The controller is configured to recognize audio data associated with a movement of the first real object and to obtain the second personal information based on the recognized audio data.

The controller is configured to generate a control signal requesting that the obtained second personal information be stored corresponding to the shape feature information of the first real object.

When the A/V data includes a third real object, the controller is configured to select at least one of the first real object or the third real object depending on movement information of the first or third real object and to display the first virtual object only for the selected real object.

When the A/V data includes a third real object, the controller is configured to select at least one of the first real object or the third real object depending on movement information of the first or third real object and to change a display property of the first virtual object displayed for the selected real object.

When there is the first personal information, the controller is configured to transmit a message for confirmation on whether to display the first virtual object to at least one of a user terminal or a user email account based on at least one of an identification number of the user terminal or an address of the user email, wherein the identification number and the address are included in the first personal information, and the message includes the first personal information.

When there is the first personal information, the controller is configured to transmit a message including the first personal information to at least one of a user terminal or a user email account based on at least one of an identification number of the user terminal or an address of the user email, wherein the identification number and the address are included in the first personal information, configured to receive a response message responding to the transmitted message, and configured, when personal information included in the response message is different from the first personal information, to display a third virtual object including the personal information included in the response message in association with the first real object.

According to an embodiment of the present invention, there is provided a server including a database, a communication unit configured to receive audio/video data (A/V data) transmitted from a first electronic device, and a controller configured to obtain shape feature information of a first real object included in the video data of the A/V data, to determine whether the database includes first personal information of the first real object based on the shape feature information, and to transmit the first personal information and the A/V data to a second electronic device when the database includes the first personal information.

The controller is configured to analyze the A/V data and to obtain second personal information of the first real object when the database does not include the first personal information.

The controller is configured to recognize a shape of a second real object associated with a movement of the first real object and to obtain the second personal information based on the recognized shape.

The controller is configured to recognize a shape of a second real object positioned to satisfy a predetermined distance condition with the first real object and to obtain the second personal information based on the recognized shape.

The controller is configured to recognize audio data associated with a movement of the first real object and to obtain the second personal information based on the recognized audio data.

The controller is configured to generate a second virtual object including the obtained second personal information, to change the A/V data to include the second virtual object, and to transmit the changed A/V data to the second electronic device.

The controller is configured to generate a first virtual object including the first personal information, to change the A/V data to include the first virtual object, and to transmit the changed A/V data to the second electronic device.

According to an embodiment of the present invention, there is provided a method of controlling an electronic device, the method including displaying video data of audio/video data (A/V data) streamed from a first electronic device, obtaining shape feature information of a first real object included in the video data, determining whether there is first personal information of the first real object based on the shape feature information, and displaying a first virtual object including the first personal information in association with the first real object when there is the first personal information.

The embodiments of the present invention provide the following effects.

When viewing a video conference and/or online class through an electronic device according to an embodiment of the present invention, a user may easily notice personal information of an opposite user positioned in a remote site during the course of the video conference and/or online class and may show the opposite user his own personal information stored in the database, thus eliminating the need of introducing himself at every conference.

According to the embodiments, a user—even when his personal information is not stored in the database—may transfer his personal information to an opposite user, e.g., by simply pulling and showing an object, such as his business card, which allows his personal information to be identified, or by placing the business card on the desk. Thus, the user may easily introduce himself to others.

When proceeding with a video conference and/or online class, a user may be easily aware of who is the current speaker and may obtain the speaker's personal information, and may thus carry out the video conference and/or online class in a more efficient way.

The electronic device of each user do not need to include a separate software module and/or hardware module for performing a face recognition algorithm or an algorithm to obtain a user's personal information from an object, such as a business card, including the personal information. For example, when including a software module and/or hardware module for connection to the server, each electronic device may conduct both the face recognition algorithm and the algorithm for obtaining the personal information from the object including the personal information and may transfer A/V data reflecting the result to each electronic device. Accordingly, the data process resource of each electronic device may decrease.

BRIEF DESCRIPTION OF THE DRAWINGS

The embodiments of the present invention will become readily apparent by reference to the following detailed description when considered in conjunction with the accompanying drawings wherein:

FIG. 3 is a view for describing an environment according to an embodiment of the present invention;

FIGS. 11 to 13 are views illustrating methods of obtaining personal information from A/V data according to some embodiments of the present invention;

DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

Figure 1:
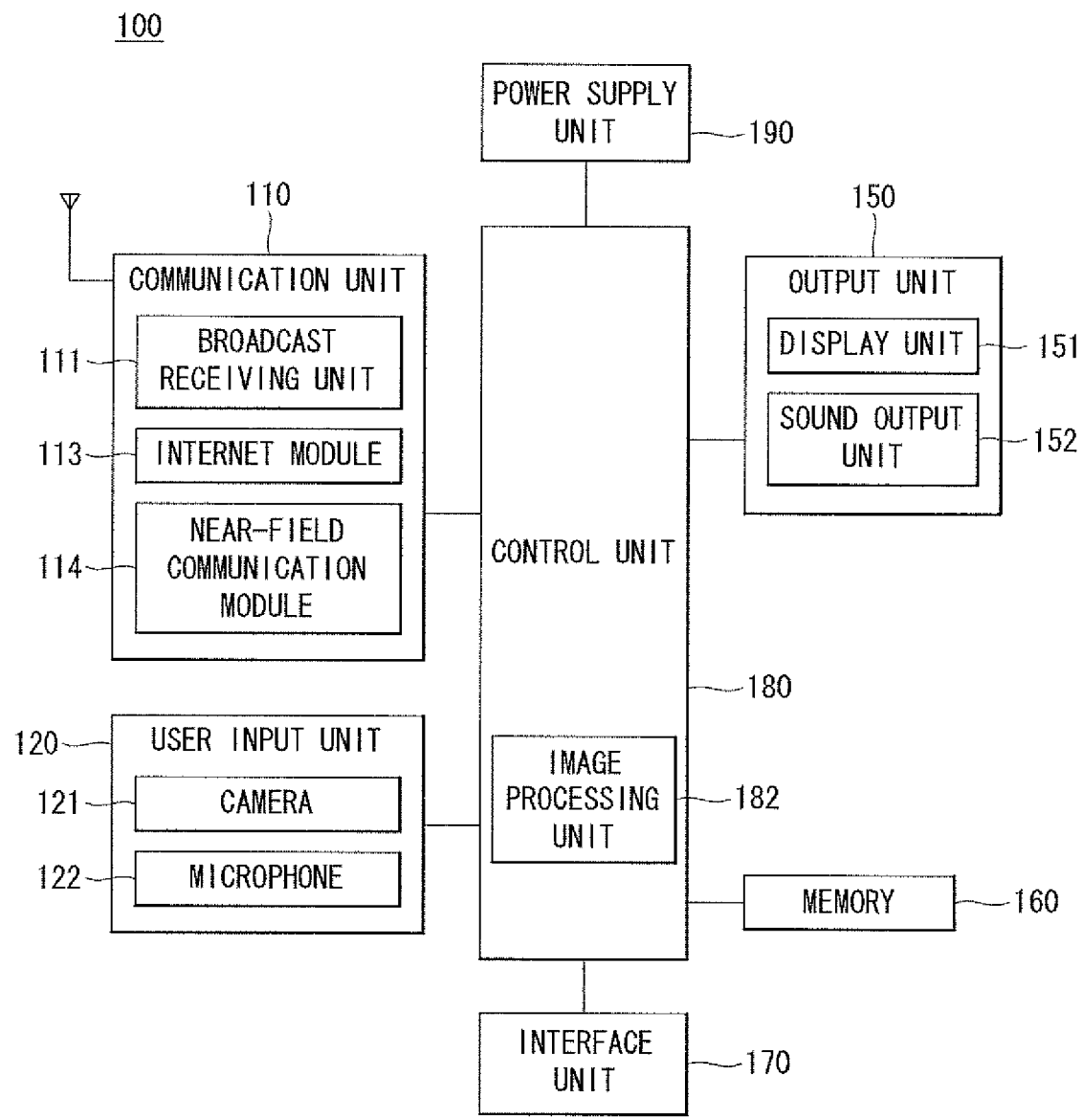
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a communication unit 110, a user input unit 120, an output unit 150, a memory 160, an interface unit 170, a control unit 180, and a power supply unit 190. The components shown in FIG. 1 may be components that may be commonly included in an electronic device. Accordingly, more or less components may be included in the electronic device 100.

The communication unit 110 may include one or more modules that enable communication between the electronic device 100 and a communication system or between the electronic device 100 and another device. For instance, the communication unit 110 may include a broadcast receiving unit 111, an Internet module 113, and a near-field communication module 114.

The broadcast receiving unit 111 receives broadcast signals and/or broadcast-related information from an external broadcast managing server through a broadcast channel.

The broadcast channel may include a satellite channel and a terrestrial channel. The broadcast managing server may refer to a server that generates broadcast signals and/or broadcast-related information and broadcasts the signals and/or information or a server that receives pre-generated broadcast signals and/or broadcast-related information and broadcasts the signals and/or information to a terminal. The broadcast signals may include TV broadcast signals, radio broadcast signals, data broadcast signals as well as combinations of TV broadcast signals or radio broadcast signals and data broadcast signals.

The broadcast-related information may refer to information relating to broadcast channels, broadcast programs, or broadcast service providers. The broadcast-related information may be provided through a communication network.

The broadcast-related information may exist in various forms, such as, for example, EPGs (Electronic Program Guides) of DMB (Digital Multimedia Broadcasting) or ESGs (Electronic Service Guides) of DVB-H (Digital Video Broadcast-Handheld).

The broadcast receiving unit 111 may receive broadcast signals using various broadcast systems. Broadcast signals and/or broadcast-related information received through the broadcast receiving unit 111 may be stored in the memory 160.

The Internet module 113 may refer to a module for access to the Internet. The Internet module 113 may be provided inside or outside the electronic device 100.

The near-field communication module 114 refers to a module for near-field communication. Near-field communication technologies may include Bluetooth, RFID (Radio Frequency Identification), IrDA (Infrared Data Association), UWB (Ultra Wideband), and ZigBee technologies.

The user input unit 120 is provided for a user's entry of audio or video signals and may include a camera 121 and a microphone 122.

The camera 121 processes image frames including still images or videos as obtained by an image sensor in a video call mode or image capturing mode. The processed image frames may be displayed by the display unit 151. The camera 121 may perform 2D or 3D image capturing or may be configured as one or a combination of 2D and 3D cameras.

The image frames processed by the camera 121 may be stored in the memory 160 or may be transmitted to an outside device through the communication unit 110. According to an embodiment, two or more cameras 121 may be included in the electronic device 100.

The microphone 122 receives external sound signals in a call mode, recording mode, or voice recognition mode and processes the received signals as electrical voice data. The microphone 122 may perform various noise cancelling algorithms to remove noises created when receiving the external sound signals. A user may input various voice commands through the microphone 122 to the electronic device 100 to drive the electronic device 100 and to perform functions of the electronic device 100.

The output unit 150 may include a display unit 151 and a sound output unit 152.

The display unit 151 displays information processed by the electronic device 100. For example, the display unit 151 displays a UI (User Interface) or GUI (Graphic User Interface) associated with the electronic device 100. The display unit 151 may be at least one of a liquid crystal display, a thin film transistor liquid crystal display, an organic light emitting diode display, a flexible display, and a 3D display. The display unit 151 may be configured in a transparent or light transmissive type, which may be called a "transparent display" examples of which include transparent LODs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The sound output unit 152 may output audio data received from the communication unit 110 or stored in the memory 160. The sound output unit 152 may output sound signals associated with functions (e.g., call signal receipt sound, message receipt sound, etc.) performed by the electronic device 100. The sound output unit 152 may include a receiver, a speaker, and a buzzer.

The memory 160 may store a program for operation of the control unit 180, and may preliminarily store input/output data (for instance, phone books, messages, still images, videos, etc.). The memory 160 may store data relating to vibrations and sounds having various patterns, which are output when the touch screen is touched.

The memory 160 may include at least one storage medium of flash memory types, hard disk types, multimedia card micro types, card type memories (e.g., SD or XD memories), RAMs (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The control unit 180 controls the overall operation of the electronic device 100. For example, the control unit 180 performs control and processes associated with voice call, data communication, and video call. The control unit 180 may include an image processing unit 182 for image process. The image processing unit 182 is described below in relevant parts in greater detail.

The power supply unit 190 receives internal or external power under control of the control unit 180 and supplies the power to each component for operation of the component.

The embodiments described herein may be implemented in software or hardware or in a combination thereof, or in a recording medium readable by a computer or a similar device to the computer. When implemented in hardware, the embodiments may use at least one of ASICs (application specific integrated circuits), DSPs (digital signal processors), DSPDs (digital signal processing devices), PLDs (programmable logic devices), FPGAs (field programmable gate arrays, processors, controllers, micro-controllers, microprocessors, and electrical units for performing functions. According to an embodiment, the embodiments may be implemented by the control unit 180.

When implemented in software, some embodiments, such as procedures or functions, may entail a separate software module for enabling at least one function or operation. Software codes may be implemented by a software application written in proper programming language. The software codes may be stored in the memory 160 and may be executed by the control unit 180.

Figure 2:
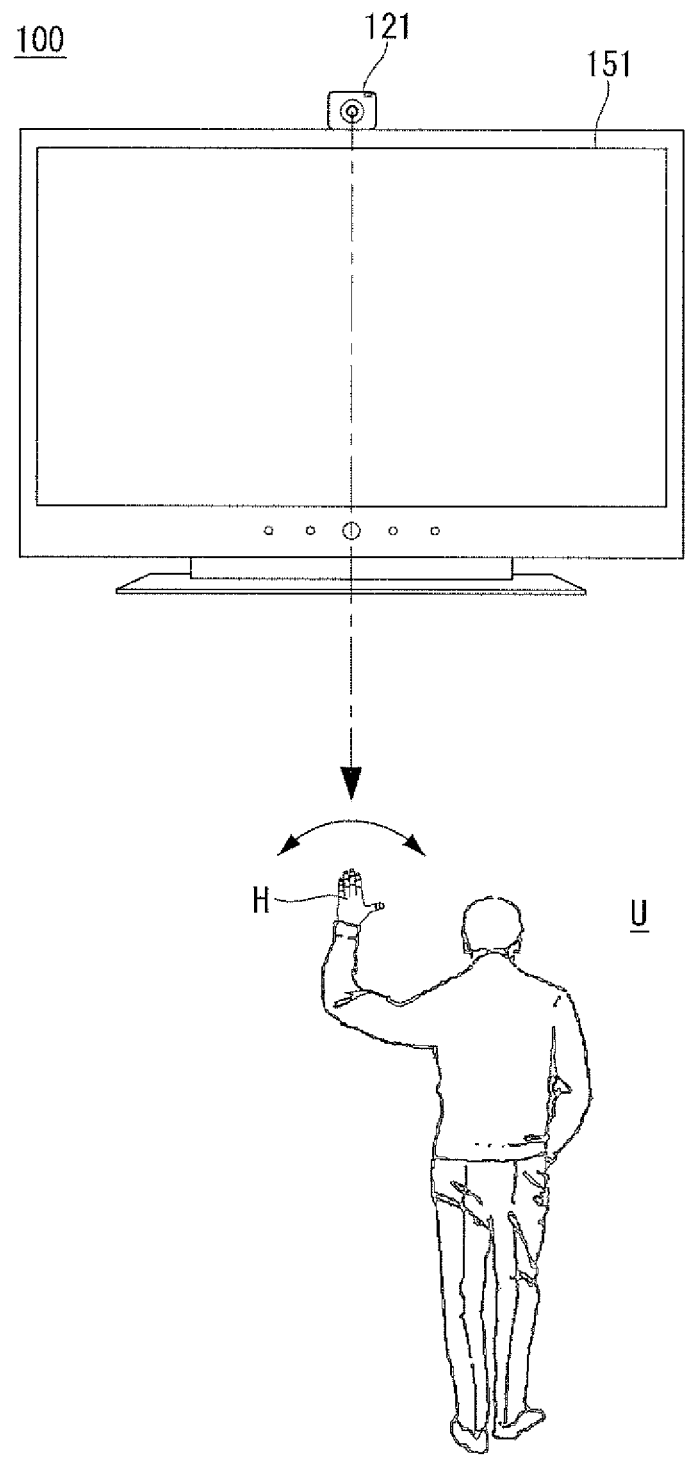
FIG. 2 is a view illustrating an example where a user inputs a gesture to an electronic device as shown in FIG. 1.

FIG. 2 is a view illustrating an example where a user inputs a gesture to an electronic device as shown in FIG. 1.

Referring to FIG. 2, the electronic device 100 may capture the gesture of the user U and may perform a proper function corresponding to the gesture.

The electronic device 100 may be any electronic device having the display unit 151 that can display images. The electronic device 100 may be a stationary terminal, such as a TV shown in FIG. 2, which is bulky and thus placed in a fixed position, or may be a mobile terminal such as a cell phone. The electronic device 100 may include the camera 121 that may capture the gesture of the user U.

The camera 121 may be an optical electronic device that performs image capturing in a front direction of the electronic device 100. The camera 121 may be a 2D camera for 2D image capturing and/or a 3D camera for 3D image capturing. Although in FIG. 2 one camera 121 is provided at a top central portion of the electronic device 100 for ease of description, the number, location, and type of the camera 121 may vary as necessary.

The control unit 180 may trace a user U having a control right when discovering the user U. The issue and trace of the control right may be performed based on an image captured by the camera 121. For example, the control unit 180 may analyze a captured image and continuously determine whether there a specific user U exists, whether the specific user U performs a gesture necessary for obtaining the control right, and whether the specific user U moves or not.

The control unit 180 may analyze a gesture of a user having the control right based on a captured image. For example, when the user U makes a predetermined gesture but does not own the control right, no function may be conducted. However, when the user U has the control right, a predetermined function corresponding to the predetermined gesture may be conducted.

The gesture of the user U may include various operations using his/her body. For example, the gesture may include the operation of the user sitting down, standing up, running, or even moving. Further, the gesture may include operations using the user's head, foot, or hand H. For convenience of illustration, a gesture of using the hand H of the user U is described below as an example. However, the embodiments of the present invention are not limited thereto.

According to an embodiment, analysis of a hand gesture may be conducted in the following ways.

First, the user's fingertips are detected, the number and shape of the fingertips are analyzed, and then converted into a gesture command.

The detection of the fingertips may be performed in two steps.

First, a step of detecting a hand area may be performed using a skin tone of a human. A group of candidates for the hand area is designated and contours of the candidates are extracted based on the human's skin tone. Among the candidates, a candidate the contour of which has the same number of points as a value in a predetermined range may be selected as the hand.

Secondly, as a step of determining the fingertips, the contour of the candidate selected as the hand is run around and a curvature is calculated based on inner products between adjacent points. Since the fingertips show sharp variation of their curvatures, when a change in a curvature of a fingertip exceeds a threshold value, the fingertip is chosen as a fingertip of the hand. The fingertips thusly extracted may be converted into meaningful commands during gesture-command conversion.

According to an embodiment, it is often necessary with respect to a gesture command for a synthesized virtual 3D image (3D object) to judge whether a contact has occurred between the virtual 3D image and a user's gesture. For example, it may be necessary, as is often case, whether there is a contact between an real object and a virtual object to manipulate the virtual object interposed in the real object.

Whether the contact is present or not may be determined by various collision detection algorithms. For instance, a rectangle bounding box method and a bounding sphere method may be adopted for such judgment.

The rectangle bounding box method compares areas of rectangles surrounding a 2D object for collision detection.

The rectangle bounding box method has merits such as being less burden in calculation and easy to follow. The bounding sphere method determines whether there is collision or not by comparing radii of spheres surrounding a 3D object.

For example, a depth camera may be used for manipulation of a real hand and a virtual object. Depth information of the hand as obtained by the depth camera is converted into a distance unit for a virtual world for purposes of rendering of the virtual image, and collision with the virtual object may be detected based on a coordinate.

Hereinafter, an exemplary environment in which the embodiments of the present invention are implemented is described. FIG. 3 is a view for describing an environment according to an embodiment of the present invention.

Referring to FIG. 3, a first user U1 and a second user U2 are positioned in a first place and a second place, respectively. The first user U1 may be a person who hosts a video conference and/or provides lectures to a number of other people including the second user U2, and the second user U2 may be a person who attends the video conference hosted by the first user U1.

A voice and/or motion of the first user U1 may be obtained and converted into video data and/or audio data (also referred to as "A/V data") by an electronic device 200 arranged in the first place. Further, the video data and/or audio data may be transferred through a predetermined network (communication network) to another electronic device 300 positioned in the second place. The first electronic device 300 may output the transferred video data and/or audio data through an output unit in a visual or auditory manner. The first electronic device 300 and the first electronic device 300 each may be the same or substantially the same as the electronic device 100 described in connection with FIG. 1. However, according to an embodiment, each of the first electronic device 300 and the first electronic device 300 may include only some of the components of the electronic device 100. According to an embodiment, the components of the first electronic device 300 may be different from the components of the first electronic device 300.

FIG. 3 illustrates an example where the first electronic device 300 obtains and transfers the video data and/or audio data and the first electronic device 300 outputs the transferred video data and/or audio data. According to an embodiment, the first electronic device 300 and the first electronic device 300 may switch to each other in light of functions and operations, or alternatively, each of the first electronic device 300 and the first electronic device 300 may perform the whole functions described above.

For example, the first user U1 may transfer his image and/or voice through the first electronic device 300 to the first electronic device 300 and may receive and output an image and/or voice of the second user U2. Likewise, the first electronic device 300 may also perform the same functions and operations as the first electronic device 300.

Figure 4:
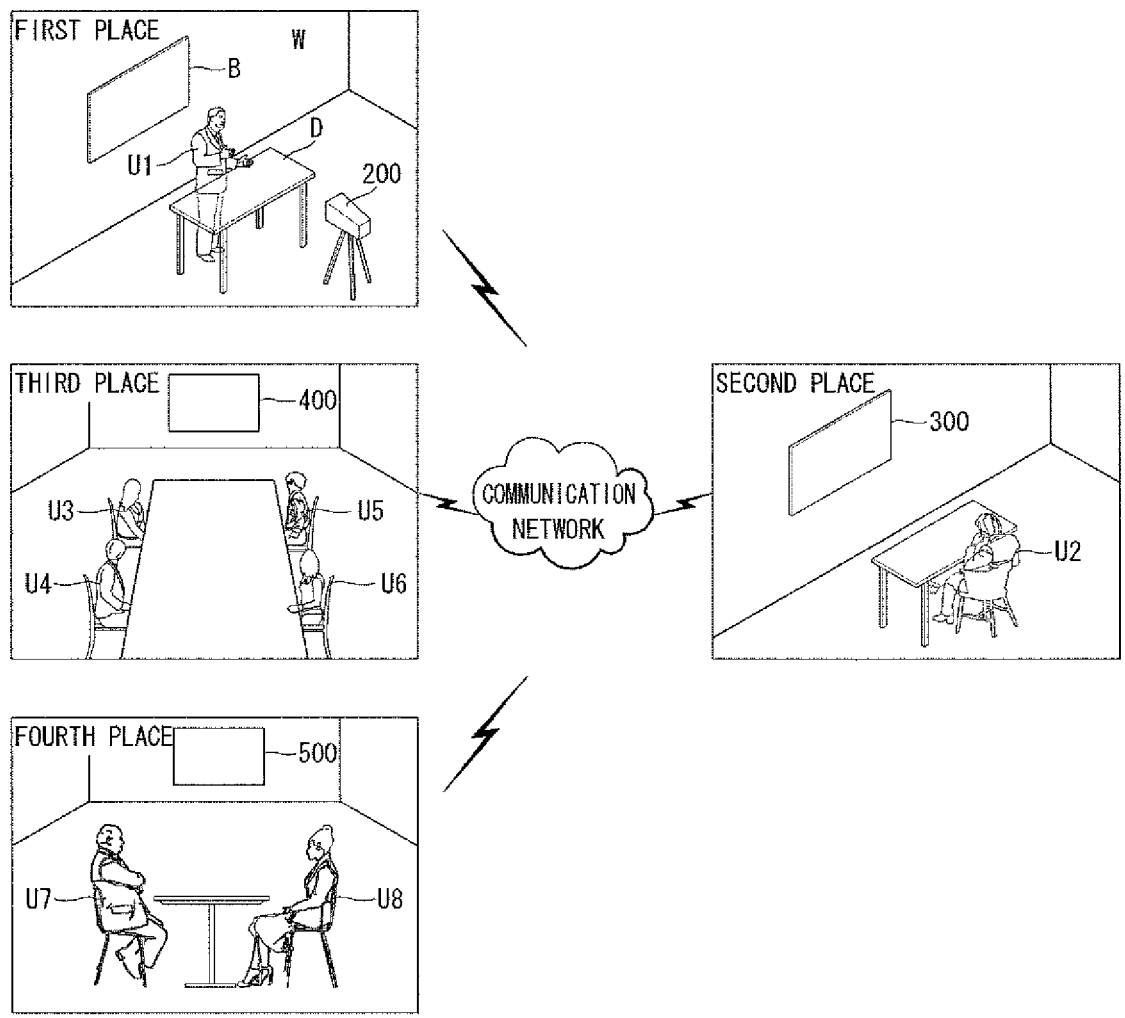
FIG. 4 is a view for describing another environment according to an embodiment of the present invention.

FIG. 4 is a view for describing another environment according to an embodiment of the present invention.

Referring to FIG. 4, third to sixth users U3, U4, U5, and U6 attend the video conference through an electronic device 400 positioned in a third place, and seventh and eighth users U7 and U8 attend the video conference through an electronic device 500 positioned in a fourth place.

Unlike the environment illustrated in FIG. 3, where two electronic devices 200 and 300 communicate with each other, the environment shown in FIG. 4 allows three or more electronic devices to communicate with one another for the video conference. Under the environment illustrated in FIG. 4, the "first electronic device" may refer to the electronic device 300 positioned in the second place, and "second electronic device" may, unless stated otherwise, refer to at least one of the electronic device 200 positioned in the first place, the electronic device 400 positioned in the third place, and the electronic device 500 position in the fourth place.

Hereinafter, a method of controlling an electronic device according to an embodiment is described. For convenience of description, the control method may be implemented by the electronic device 100 described in connection with FIG. 1. The "first electronic device" may refer to the electronic device 300 positioned in the second place as shown in FIG. 3 or 4, and "second electronic device" may refer to the electronic device 200 positioned in the first place as shown in FIG. 3, or the electronic device 400 positioned in the third place or the electronic device 500 positioned in the fourth place as shown in FIG. 4. However, the embodiments of the present invention are not limited thereto.

Figure 5:
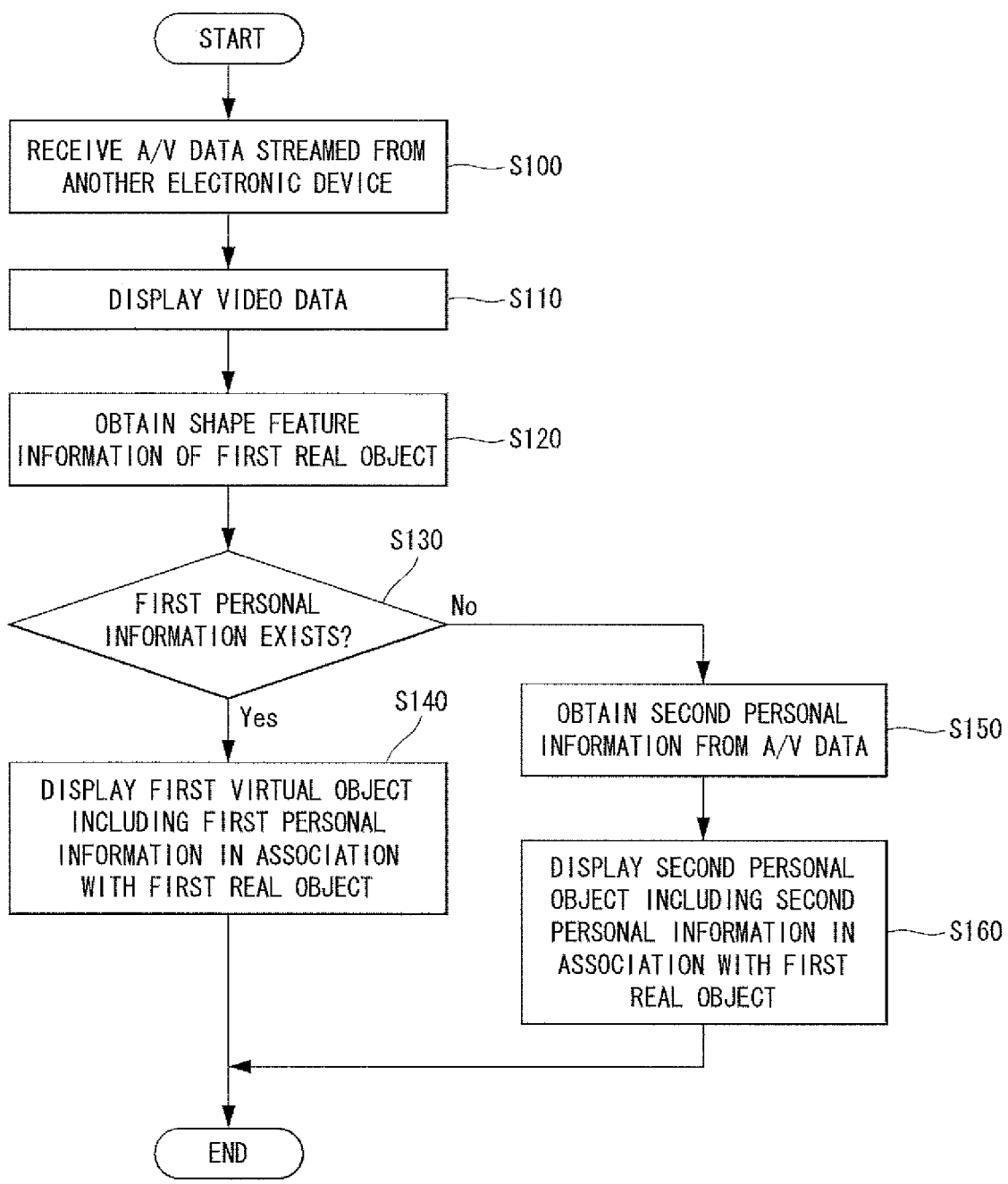
FIG. 5 is a flowchart illustrating a method of controlling an electronic device according to an embodiment of the present invention.

FIG. 5 is a flowchart illustrating a method of controlling an electronic device according to an embodiment of the present invention.

Referring to FIG. 5, the control method includes a step of receiving A/V data streamed from the second electronic device (S100), a step of displaying the video data of the A/V data (S110), a step of obtaining shape feature information of a first real object included in the video data (S120), a step of determining whether there is first personal information corresponding to the first real object based on the obtained shape feature information (S130), and a step of, when there is the first personal information, displaying a first virtual object including the first personal information in association with the first real object (S140).

When there is no first personal information, at least one of a step of obtaining second personal information corresponding to the first real object from the A/V data (S150) and a step of displaying a second virtual object including the second personal information in association with the first real object (S160) may be performed. Each step is now described in greater detail.

The first electronic device 100 or 300 may receive A/V data streamed from the second electronic device 200, 400, or 500 (S100). For example, as shown in FIG. 3 and/or FIG. 4, A/V data for the first user U1 positioned in the first place, the third to sixth users U3, U4, U5, and U6 positioned in the third place, and the seventh and eighth users U7 and U8 positioned in the fourth place is obtained by the second electronic device 200, 400, or 500, and the obtained A/V data may be streamed to the first electronic device 100 or 300. The A/V data may be transmitted from the second electronic device 200, 400, or 500 to the first electronic device 100 or 300 over a network directly or via a server (not shown).

The first electronic device 100 or 300 may display video data included in the A/V data (S110). For example, the first electronic device 100 or 300 may separate the video data from the received A/V data in step S100 and may display the separated video data through the display unit 151.

Figure 6:
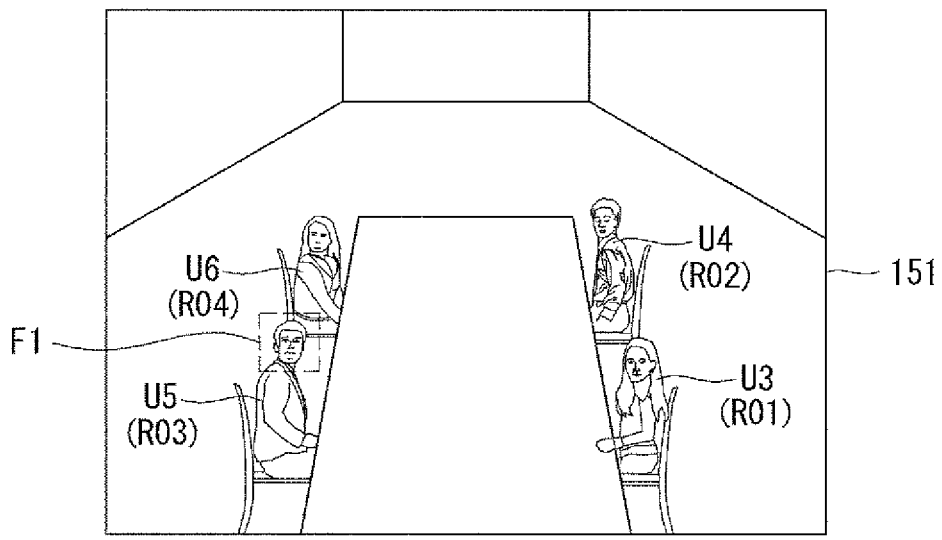
FIG. 6 is a view illustrating an example where received A/V data is displayed by an electronic device according to an embodiment of the present invention.

FIG. 6 illustrates an example where received A/V data is displayed by an electronic device according to an embodiment of the present invention. Referring to FIG. 6, the A/V data obtained by the second electronic device 400 positioned in the third place as shown in FIG. 4 is displayed through the display unit 151 of the first electronic device 100 or 300.

Subsequently, the first electronic device 100 or 300 may obtain the shape feature information of the first real object included in the video data (S120).

The first real object refers to an image reflecting the first to eighth users included in the video data. For example, images RO1, RO2, RO3, and RO4 respectively corresponding to the third to sixth users as shown in FIG. 6 are the first real object.

The shape feature information of the first real object may mean face recognition information for users corresponding to the first real object. For example, the shape feature information may be feature information on a user's face contour. According to the type of a face recognition algorithm for recognizing the user's face contour, information on various feature points and/or positional relationship between the feature points may be included in the shape feature information. According to an embodiment, any known or to-be-developed face recognition algorithms may apply to the recognition of the face contour.

Figure 7:
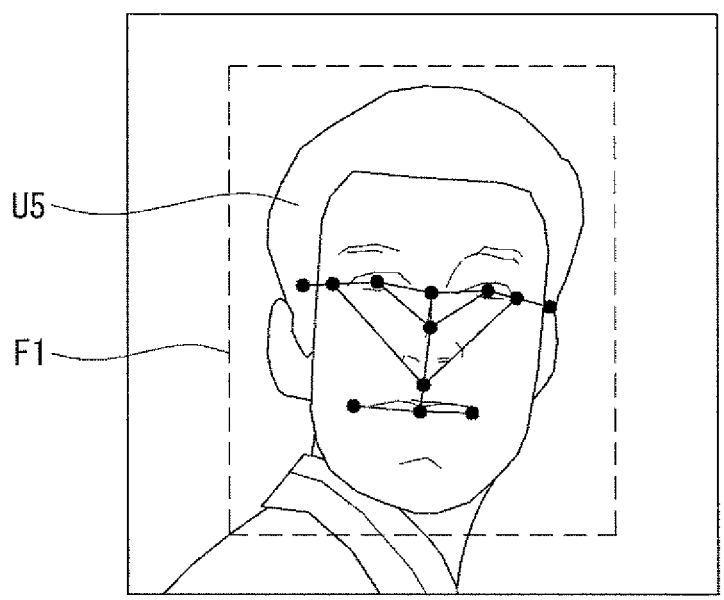
FIG. 7 is a view illustrating an example of obtaining shape feature information according to an embodiment of the present invention.

The first electronic device 100 or 300 may obtain the shape feature information by recognizing the face of each first real object RO1, RO2, RO3, or RO4 followed by applying a predetermined face recognition algorithm to the face. As shown in FIG. 6, the electronic device 100 or 300 may analyze the video data received from the second electronic device 400 to recognize the face F1 of the fifth user U5, and as shown in FIG. 7, may obtain the shape feature information (e.g., face recognition information) on the fifth user U5 by obtaining feature points for recognizing the fifth user's face and/or a positional relationship between the feature points.

The first electronic device 100 or 300 may determine whether there is first personal information corresponding to each of the first real object RO1, RO2, RO3, and RO4 based on the obtained shape feature information (S130).

The first electronic device 100 or 300 may include a database that stores personal information on a plurality of people, the personal information matching the shape feature information (face recognition information) for the respective people. Under this situation, the first electronic device 100 or 300 may perform a search to determine whether the database stores personal information matching the shape feature information obtained in step S120.

The database may be provided outside the first electronic device 100 or 300. For example, the database may be provided in an entity including an in-house server or a server for providing a face recognition service. In such case, the first electronic device 100 or 300 may transmit the shape feature information obtained in step S120 to an external entity including the database. Accordingly, the external entity may search the database and transmit a searched result to the first electronic device 100 or 300.

Figures 8, 9:
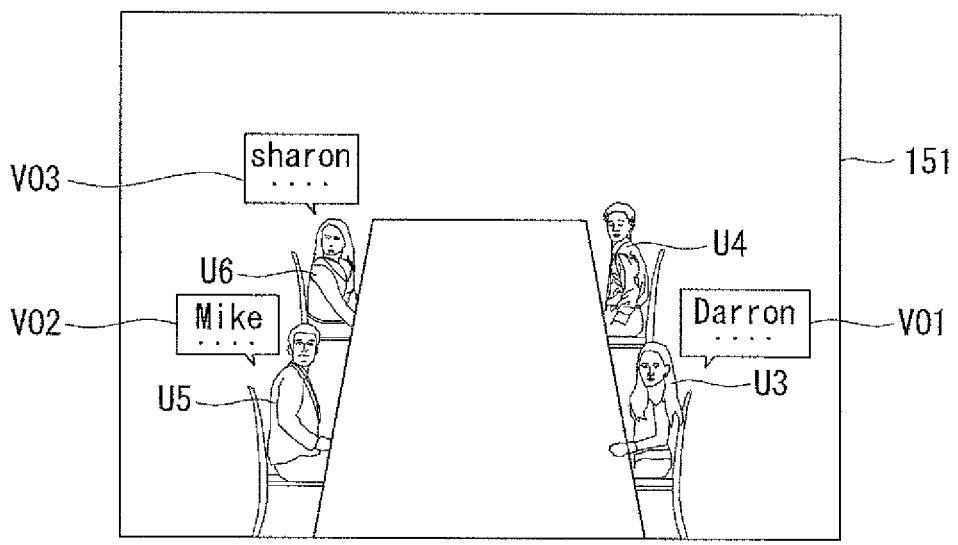
FIG. 8 is a view illustrating an exemplary database storing personal information according to an embodiment of the present invention.
FIG. 9 is a view illustrating an example of displaying virtual objects in association with real objects according to an embodiment of the present invention.

FIG. 8 illustrates an exemplary database storing personal information according to an embodiment of the present invention. Referring to FIG. 8, the database stores the name, department, title, phone number, e-mail address, and shape feature information of each user, with these items matching one another. In performing step S130, the first electronic device 100 or 300 may analyze the A/V data transmitted from the second electronic device 400 to obtain the shape feature information (face recognition information) of each user reflected in the A/V data and may determine whether the database stores the shape feature information conforming to the obtained shape feature information (face recognition information).

When a result of performing step S130 shows that the database stores the first personal information, the first electronic device 100 or 300 may display the first virtual object including the first personal information in association with the first real object (S140).

FIG. 9 illustrates an example of displaying virtual objects in association with real objects according to an embodiment of the present invention. Referring to FIG. 9, the shape feature information of the first real object RO1 corresponding to the third user U3 conforms to the shape feature information FI3 of 'Darron' which is stored in the database, there is no shape feature information that conforms to the shape feature information of the first real object RO2 corresponding to the fourth user U4, the shape feature information of the first real object RO3 corresponding to the fifth user U5 conforms to the shape feature information FI1 of 'Mike' which is stored in the database, and the shape feature information of the first real object RO4 corresponding to the sixth user 06 conforms to the shape feature information FI2 of 'Sharon' which is stored in the database.

The first electronic device 100 or 300 performs step S130 to obtain from the database the first personal information corresponding to each first real object RO1, RO2, RO3, or RO4 included in the video data and to display the first virtual objects VO1, VO2, and VO3 including the first personal information through the display unit 151.

As shown in FIG. 9, the database includes the shape feature information conforming to the shape feature information corresponding to each of the third, fifth, and sixth users U3, U5, and U6 (e.g., the personal information corresponding to each user is stored in the database), so that the first virtual objects VO1, VO2, and VO3 respectively corresponding to the users are generated and displayed together. However, the database does not store personal information corresponding to the fourth user U4, so that the first virtual object corresponding to the fourth user U4 is not displayed.

The first virtual objects VO1, VO2, and VO3 may be displayed together with the respective corresponding first real objects RO1, RO3, and RO4 in association with the first real objects RO1, RO3, and RO4.

The phrase "the virtual objects are displayed in association with the corresponding real objects" means that the virtual objects are displayed together with the real objects so that a user can feel as if a particular virtual object is associated with a particular real object when virtually recognizing the virtual and real objects.

Figure 10:
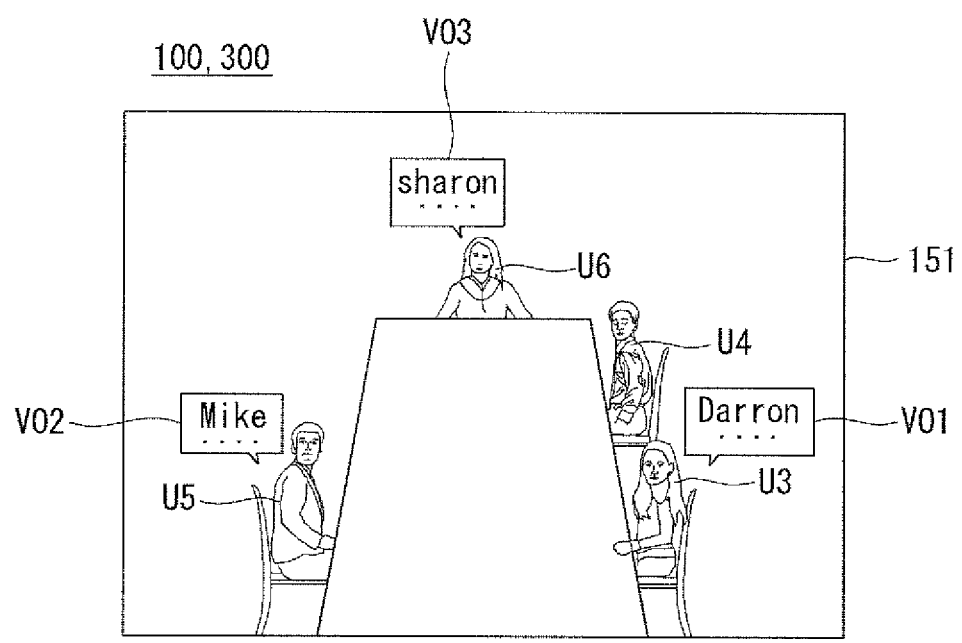
FIG. 10 is a view illustrating an example of displaying virtual objects in association with real objects according to an embodiment of the present invention.

For example, referring to FIG. 10 which illustrates a method of displaying virtual objects in association with real objects according to an embodiment of the present invention, the sixth user U6 has been relocated to a position different from the position shown in FIG. 9. Under this circumstance, the first virtual object VO3 corresponding to the sixth user U6 is also relocated. As shown in FIG. 10, virtual objects are displayed to match the positions of real objects, thus allowing a user to easily notice which virtual object is associated with a specific real object.

FIG. 10 illustrates merely an example of associating virtual objects with real objects, and the embodiments of the present invention are not limited thereto. For example, according to an embodiment, straight and/or curved lines may be displayed to associate or connect the virtual objects with the real objects so that the relevancy between the virtual and real objects can be noticed. According to an embodiment, when the virtual objects change their positions, the virtual objects may be associated and displayed with the real objects by changing the lengths or positions of the straight and/or curved lines connecting the virtual and real objects to each other rather than changing the positions of the virtual objects.

As shown in FIGS. 9 and 10, the virtual objects may be displayed not to overlap the real objects. For example, the first electronic device 100 or 300 may identify a first region occupied by the real objects and display the virtual objects on a second region other than the first region. Accordingly, in the case that a user corresponding to an real object moves during a video conference and/or online class, and the real object approaches a virtual object, the virtual object may be relocated. For example, as shown in FIG. 10, when the fifth user U5 approaches the virtual object VO3 corresponding to the sixth user U6, the virtual object VO3 may be relocated not to overlap the real object corresponding to the third user U5.

According to an embodiment, in displaying the virtual objects including users' personal information, the first electronic device 100 or 300 may transfer a message inquiring whether to display identified personal information to an electronic device of a user corresponding to an real object determined to include personal information in step S130, and only when receiving a message responding to the inquiry message, may display the virtual object. For example, before displaying the virtual objects VO1, VO2, and VO3 as shown in FIG. 9, the first electronic device 100 or 300 may transmit a message of requesting confirmation on display of the virtual objects to users' electronic devices (e.g., smartphones or other portable communication devices) based on the phone numbers (or e-mail addresses) of the users U3, U5, and U6 included in the identified personal information, and only when receiving a message responding to the request message, may display the virtual objects.

The message transmitted to each user's electronic device may include each user's personal information as identified. Checking the message, each user may identify whether his identified personal information conforms to current information. When there is a change in the personal information included in the transmitted message, each user may transmit the confirmation message together with modified personal information. When the personal information changes, the first electronic device 100 or 300 may update the database by reflecting the modified personal information received from each user and may generate and display the virtual objects based on the modified personal information.

When it is determined in step S130 that there is no first personal information, the first electronic device 100 or 300 may obtain second personal information corresponding to the first real object from the received A/V data (S150).

Obtaining the second personal information may be performed by various methods. Specific examples are now described below.

Figure 12:
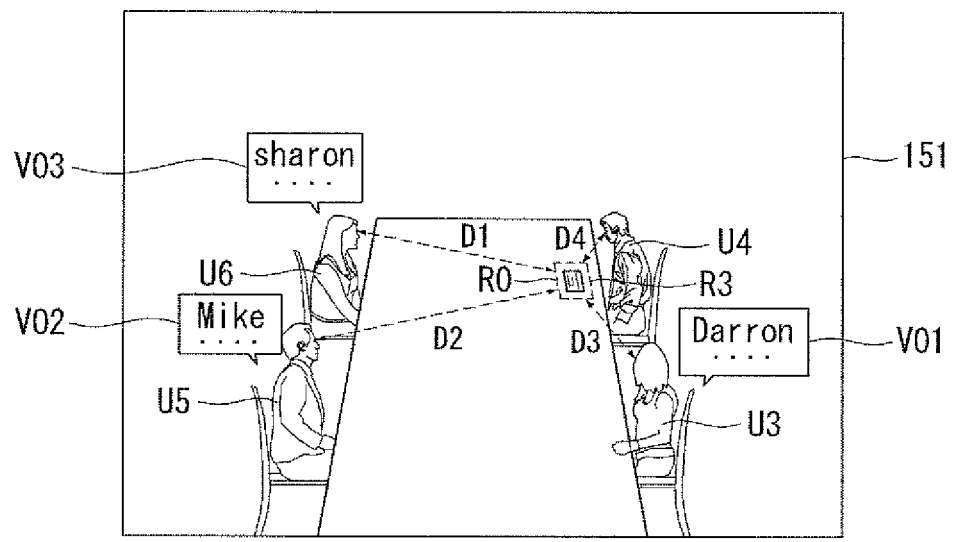
Figure 13:
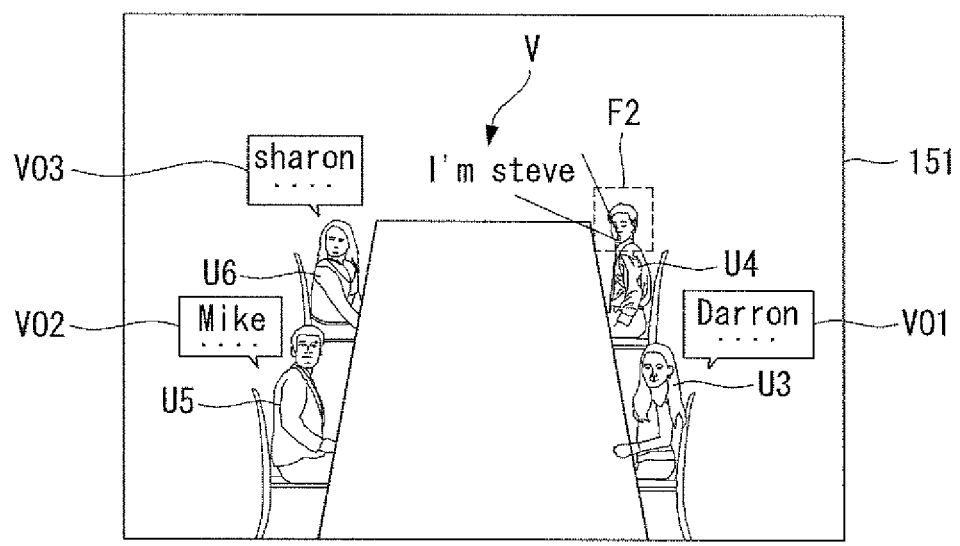

FIGS. 11 to 13 illustrate methods of obtaining personal information from A/V data according to some embodiments of the present invention.

A method of obtaining personal information from A/V data is described with reference to FIG. 11. Referring to (a) of FIG. 11, the forth user U4 puts his hand in a pocket of his jacket, and referring to (b) of FIG. 11, the forth user U4 pulls his business card out of the pocket and places the business card on the desk. Under this situation, the first electronic device 100 or 300 may newly recognize the business card included in the A/V data according to the fourth user's movement, and may obtain personal information of the fourth user U4.

For example, the first electronic device 100 or 300 may monitor in real time the movement of the first real object (e.g., an image reflecting the fourth user shown in FIGS. 9 and 10) that is determined not to have the first personal information in step S130. For example, as shown in FIG. 11, when the fourth user's arm moves, the first electronic device 100 or 300 may sense the movement of the fourth user U4. Upon recognition of the second real object (RO, e.g., the business card) newly included according to the first real object's movement, the first electronic device 100 or 300 may analyze content of a region R1 in which the second real object RO is included. The first electronic device 100 or 300 may obtain the second personal information of the fourth user based on a result of the analysis.

When a business card is newly included in the A/V data as the real object by the user's movement, the first electronic device 100 or 300 may obtain personal information from the business card by using a text recognition technology. According to an embodiment, when the real object newly included in the A/V data includes a specific image obtained by encoding information, such as a QR code, bar code, color code, or the like, the first electronic device 100 or 300 may decode the encoded information to obtain the second personal information.

It has been described that the user pulls his name card out of the pocket. However, the first electronic device 100 or 300 may also obtain the user's personal information from the A/V data by the afore-described method even when the user raises the business card in his hand as shown in (c) of FIG. 11.

Subsequently, a method of obtaining personal information from A/V data is described with reference to FIG. 12. Referring to FIG. 12, a business card is placed on a desk in the third place. The first electronic device 100 or 300 may calculate a distance D4 between the business card and the fourth user U4 whose personal information is not stored in the database. Also, the first electronic device 100 or 300 may calculate distances D1, D2, and D3 between the other users U3, U5, and U6 and the business card. When the distance D4 between the fourth user U4 and the business card is shorter than the distances D1, D2, and D3—e.g., when the business card is positioned closest to the fourth user U4—the first electronic device 100 or 300 may determine that the personal information obtained by the business card corresponds to the fourth user U4.

For example, the first electronic device 100 or 300 may recognize the business card included in the A/V data in real time, and when a position of the business card as recognized conforms to a predetermined distance condition with respect to the first real object (first real object whose personal information is not stored in the database) corresponding to the fourth user U4—for example, when the business card is closer to the first real object corresponding to the fourth user U4 than the other first real objects—the first electronic device 100 or 300 may make the personal information obtained by the business card correspond to the first real object.

The business card has been exemplified in connection with FIG. 12. Alternatively, the business card may be replaced with other objects storing personal information, such as a QR code, bar code, or color code, as described in connection with FIG. 11.

A method of obtaining personal information from A/V data is described with reference to FIG. 13. FIG. 13 illustrates that A/V data obtained when the fourth user U4 speaks is visually or audibly output through the first electronic device 100 or 300. For example, the video data included in the A/V data is visually output through the display unit 151, and the audio data corresponding to the video data is audibly output through the sound output unit 152. While monitoring a face region F2 of the fourth user U4 (whose personal information is not stored in the database) included in the video data, the first electronic device 100 or 300 may recognize a voice V included in the audio data output in synchronization with the video data when the fourth user's lips move.

The voice V may be to introduce the fourth user U4. The first electronic device 100 or 300 may obtain information corresponding to the voice V using a voice recognition technology. When the voice V introduces the personal information of the fourth user U4, the first electronic device 100 or 300 may obtain the personal information of the fourth user U4. When the voice V says, "I'm Steve," at the point when the fourth user's lips move, the first electronic device 100 or 300 may determine that the fourth user's name is 'Steve' by recognizing the voice V. The first electronic device 100 or 300 may obtain through the voice V the other personal information (e.g., department, title, phone number, or e-mail address) than the name.

For example, the first electronic device 100 or 300 keeps monitoring the first real objects (in particular, the face regions of the first real objects) that are, in step S130, determined not to include first personal information in the database, and when sensing a particular movement (e.g., lips' movement) of the first real objects while a human voice is simultaneously included in the audio data corresponding to the time when the particular movement is sensed, the first electronic device 100 or 300 may analyze the voice and obtain personal information corresponding to the first real object from a result of the analysis.

Subsequently, the first electronic device 100 or 300 may display the second virtual object including the second personal information in association with the first real object (S160). Step S160 is similar to step S140 except that the personal information used in step S160 is obtained not from the database but from the A/V data through step S150, and the detailed description is thus omitted.

Figures 14, 15:
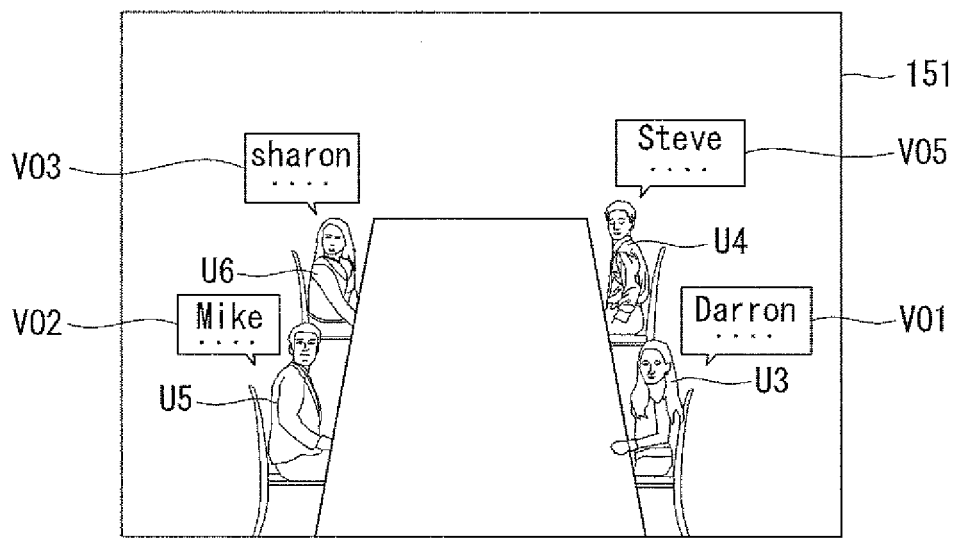
FIG. 14 is a view illustrating an exemplary screen that displays virtual objects including personal information obtained from A/V data in association with real objects according to an embodiment of the present invention.
FIG. 15 is a view illustrating a result of updating the database with newly obtained personal information according to an embodiment of the present invention.

FIG. 14 illustrates an exemplary screen that displays virtual objects including personal information obtained from A/V data in association with real objects according to an embodiment of the present invention. Referring to FIG. 14, as described in connection with FIGS. 9 and 10, for the fourth user U4 whose personal information is not stored in the database, the second virtual object VO4 generated based on personal information obtained in step S150 is displayed associated with the first real object RO2 corresponding to the fourth user U4.

As such, when viewing a video conference and/or online class through an electronic device according to an embodiment of the present invention, a user may easily notice personal information of an opposite user positioned in a remote site during the course of the video conference and/or online class and may show the opposite user his own personal information stored in the database, thus eliminating the need of introducing himself at every conference.

According to the embodiments, a user—even when his personal information is not stored in the database—may transfer his personal information to an opposite user, e.g., by simply pulling and showing an object, such as his business card, which allows his personal information to be identified, or by placing the business card on the desk. Thus, the user may easily introduce himself to others.

According to an embodiment, after step S150, the first electronic device 100 or 300 may store the personal information obtained in step S150 in the database. For example, the first electronic device 100 or 300 may store the obtained personal information in the database, with the personal information matching the shape feature information (face recognition information) for the first real object corresponding to the personal information. When including the database, the first electronic device 100 or 300 may update the shape feature information and the personal information for the fourth user U4 in the database. When the database is provided in an external entity, the first electronic device 100 or 300 may transmit the obtained personal information and the shape feature information to the external entity together with a control signal requesting storing the transmitted personal information and the shape feature information.

FIG. 15 illustrates a result of updating the database with newly obtained personal information according to an embodiment of the present invention. In addition to the items shown in FIG. 8, the database, as shown in FIG. 15, further includes personal information and shape feature information FI4 for the fourth user U4.

According to an embodiment, in performing step S140 and/or step S160, the first electronic device 100 or 300 may vary display properties of the first and/or second object corresponding to the first real object based on a particular movement of the first real object.

Figure 16:
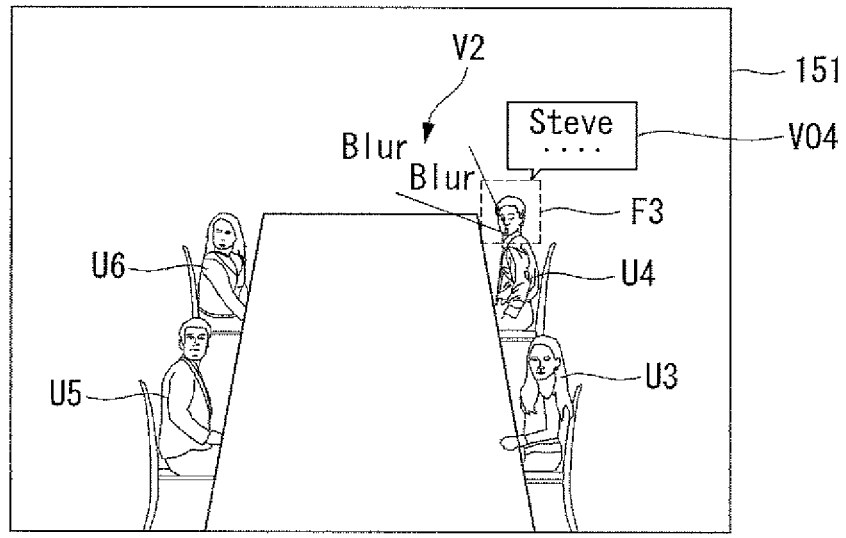
FIGS. 16 and 17 are views illustrating varying display properties of virtual objects according to some embodiments of the present invention.
Figure 17:
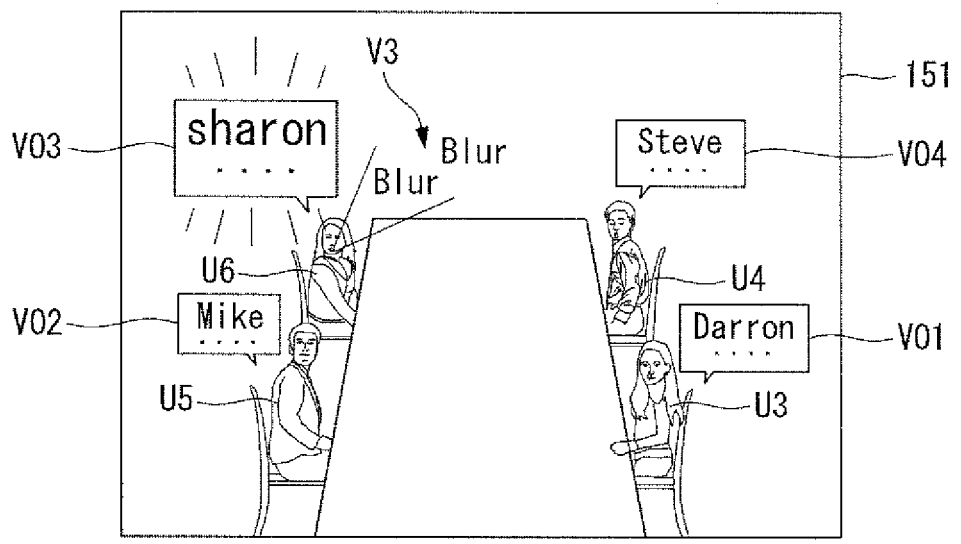

FIGS. 16 and 17 illustrate varying display properties of virtual objects according to some embodiments of the present invention.

Referring to FIG. 16, among the third to sixth users U3, U4, U5, and U6, the fourth user U4 speaks out while the first electronic device 100 or 300 may monitor the face regions of the users U3, U4, U5, and U6 to determine which user speaks a word. Under the situation shown in FIG. 16, the first electronic device 100 or 300 monitors the fourth user's face region F3, and when the fourth user's lips move and a human voice is accordingly detected from audio data corresponding to when the fourth user's lips move, the first electronic device 100 or 300 may determine that the fourth user U4 is a current speaker. When the current speaker is determined, among the virtual objects respectively corresponding to the users U3, U4, U5, and U6, the virtual object VO4 for the speaker (i.e., the fourth user) is only displayed while the virtual objects corresponding to the other users U3, U5, and U6 are not displayed. Whether each virtual object is displayed may be determined in real time depending on the movement of each user's lips.

FIG. 17 illustrates that among the third to sixth users U3, U4, U5, and U6, the sixth user U6 speaks a word. The first electronic device 100 or 300 may monitor the face regions of the users U3, U4, U5, and U6 to determine which user is the current speaker as described above. When the current speaker is determined, the first electronic device 100 or 300 may display the virtual object VO3 for the speaker (i.e., the sixth user) so that the virtual object VO3 is larger than the other virtual objects VO1, VO4, and VO2 for the other users U3, U4, and U5. For example, the size of each virtual object displayed may be determined in real time depending on the movement of each corresponding user's lips.

Figure 18:
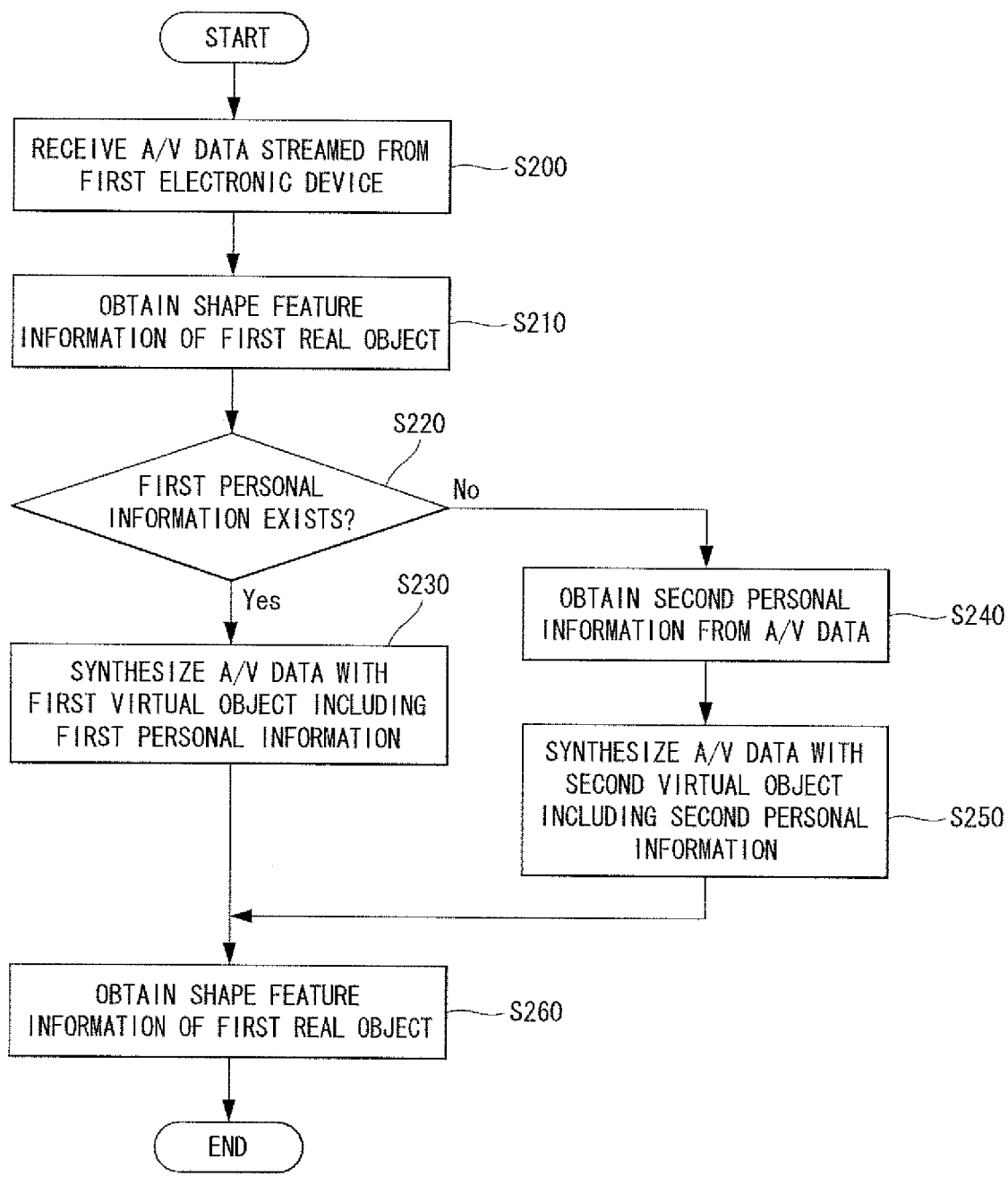
FIG. 18 is a flowchart.

The display properties of the virtual objects may include display colors, type of fonts, whether to flicker, as well as whether to display and display size as described above. Those described in connection with FIGS. 16 and 18 are merely an example, and various display properties, which vary depending on the movement of the users respectively corresponding to the virtual objects, may be adopted.

Besides the users' lips, other bodily parts of the users may also be employed for the movement for changing the display properties. For example, the movement may include waving a hand or sitting and standing.

According to an embodiment, when generating the virtual object including the user's personal information, the user may designate the type of the personal information included in the virtual object. For example, referring to FIG. 8, the personal information stored in the database includes name, department, phone number, and e-mail address. The type of the personal information to be included in the virtual object may vary depending on users. For example, a first user may designate the disclosure of only the name, department, and title, and a second user may designate the disclosure of only the name, department, phone number, and e-mail address. In such a case, the virtual object may include only the designated type of personal information. When there is no such designation, only the type of personal information as basically designated for all the users may be included in the virtual object.

Accordingly, according to the embodiments of the present invention, when proceeding with a video conference and/or online class, a user may be easily aware of who is the current speaker and may obtain the speaker's personal information, and may thus carry out the video conference and/or online class in a more efficient way.

It has been described above that virtual objects are generated and displayed by the electronic device directly used by each user to conduct the video conference. However, the embodiments of the present invention are not limited thereto. According to an embodiment, the virtual objects may be generated by a server that relays communications between the electronic devices, and A/V data reflecting the generated virtual objects may be transmitted to each opposite user's electronic device.

FIG. 18 is a flowchart illustrating a method of controlling a server according to an embodiment of the present invention.

Referring to FIG. 18, the control method includes a step of receiving audio and/or video data (also referred to as "A/V data") streamed from a first electronic device (S200), a step of obtaining shape feature information of a first real object included in the video data of the A/V data (S210), a step of determining whether there is first personal information corresponding to the first real object based on the obtained shape feature information (S220), and a step of synthesizing the A/V data with a first virtual object including the first personal information when there is any first personal information (S230).

When there is no first personal information, the control method may include a step of obtaining second personal information corresponding to the first real object from the A/V data (S240) and a step of synthesizing the A/V data with a second virtual object including the second personal information (S230). Subsequently, the control method may include a step of transmitting the synthesized A/V data to a second electronic device (S260). Each step is hereinafter described in greater detail.

Steps S200, S210, S220, and S240 are the same or substantially the same as steps S100, S120, S130, and S150 described in connection with FIG. 5, and the detailed description is thus omitted. The first electronic device may refer to an electronic device that obtains the A/V data and transmits the obtained A/V data to the server.

When it is determined in step S220 that the first personal information is included in the database, the server may synthesize the first virtual object including the first personal information with the A/V data (S230), e.g., so that the first virtual object can be displayed in association with the first real object corresponding to the first personal information.

For example, as described above in connection with FIGS. 9, 10, 16, and 17, the server may conduct the synthesis so that the first virtual object matches the corresponding first real object in light of position or so that the display properties of the first virtual object vary depending on whether a user corresponding to the first real object is a speaker. Displaying the first real object in association with the corresponding first real object has been described above, and the detailed description is not repeated.

When it is determined in step S220 that the first personal information is not included in the database, step S240 is performed to obtain the second personal information and then step S250 is performed to synthesize the A/V data with the second virtual object including the obtained second personal information. The synthesis of the A/V data with the second virtual object is the same or substantially the same as step S230, and thus the detailed description is skipped.

Subsequently, the server may transmit the A/V data synthesized in step S230 and/or step S250 to the second electronic device (S260). The second electronic device refers to an electronic device that receives and outputs the A/V data obtained by the first electronic device and/or the A/V data synthesized by the server. Accordingly, the second electronic device receives the synthesized A/V data and visually and/or audibly outputs the synthesized A/V data through the output unit 150 of the second electronic device.

According to an embodiment, the electronic device 200, 300, 400, or 500 of each user do not need to include a separate software module and/or hardware module for performing a face recognition algorithm or an algorithm to obtain a user's personal information from an object, such as a business card, including the personal information.

For example, when including a software module and/or hardware module for connection to the server, each electronic device 200, 300, 400, or 500 may conduct both the face recognition algorithm and the algorithm for obtaining the personal information from the object including the personal information and may transfer A/V data reflecting the result to each electronic device. Accordingly, the data process resource of each electronic device may decrease.

It has been described above that the server synthesizes the virtual object with the A/V data using the obtained personal information and transfers the synthesized A/V data to the second electronic device. Alternatively, instead of performing on its own the generation of the virtual object, and synthesis and transfer of the A/V data, the server may transmit the obtained personal information, together with the A/V data received from the first electronic device, to the second electronic device, so that the second electronic device may generate the virtual object corresponding to the personal information and synthesize the virtual object with the A/V data, then display the synthesized A/V data.

In the methods of operating an electronic device according to the embodiments, each step is not necessary and according to an embodiment, the steps may be selectively included therein. The steps are not necessary to perform in the order described above, and according to an embodiment, a later step may be performed earlier than an earlier step.

The steps in the methods of operating an electronic device may be performed separately or in combination thereof. According to an embodiment, steps in a method may be performed in combination with steps in another method.

The methods of operating an electronic device may be stored in a computer readable medium in the form of codes or a program for performing the methods.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. An electronic device comprising:
   a communication unit configured to receive audio/video data (A/V data) streamed from a first electronic device;
   a display unit configured to display the video data of the A/V data; and a controller configured to obtain shape feature information of a first real object included in the video data, to determine availability of first personal information associated with the first real object based on the shape feature information, to display a first virtual object including the first personal information on the display unit in association with the first real object when the first personal information is available, to analyze the A/V data, to obtain second personal information associated with the first real object when the first personal information is unavailable, and to display a second virtual object including the second personal information on the display unit in association with the first real object,
wherein the controller is further configured to recognize a shape of a second real object positioned to satisfy a predetermined distance condition with the first real object, and obtain the second personal information based on the recognized shape.

2. The electronic device of claim 1, wherein the shape feature information includes face feature information.

3. The electronic device of claim 1, wherein the controller is configured to recognize the shape of the second real object based on a movement of the first real object.

4. The electronic device of claim 1, wherein the controller is configured to recognize audio data associated with a movement of the first real object and to obtain the second personal information based also on the recognized audio data.

5. The electronic device of claim 1, wherein the controller is configured to generate a control signal requesting that the obtained second personal information be stored corresponding to the shape feature information of the first real object.

6. The electronic device of claim 1, wherein when the A/V data includes a third real object, the controller is configured to select at least one of the first real object or the third real object depending on movement information of the first or third real object and to display the first virtual object only for the selected real object.

7. The electronic device of claim 1, wherein when the A/V data includes a third real object, the controller is configured to select at least one of the first real object or the third real object depending on movement information of the first or third real object and to change a display property of the first virtual object displayed for the selected real object.

8. The electronic device of claim 1, wherein when there is the first personal information, the controller is configured to transmit a message for confirmation on whether to display the first virtual object to at least one of a user terminal or a user email account based on at least one of an identification number of the user terminal or an address of the user email, wherein the identification number and the address are included in the first personal information, and the message includes the first personal information.

9. The electronic device of claim 1, wherein when there is the first personal information, the controller is configured to transmit a message including the first personal information to at least one of a user terminal or a user email account based on at least one of an identification number of the user terminal or an address of the user email, wherein the identification number and the address are included in the first personal information, configured to receive a response message responding to the transmitted message, and configured, when personal information included in the response message is different from the first personal information, to display a third virtual object including the personal information included in the response message in association with the first real object.

10. A server comprising:
a database;
a communication unit configured to receive audio/video data (A/V data) transmitted from a first electronic device, the A/V data configured to cause display of video data on a display device; and
a controller configured to obtain shape feature information of a first real object included in the video data of the A/V data, to determine whether the database includes first personal information associated with the first real object based on the shape feature information, to generate a first virtual object including the first personal information, to update the A/V data to include the first virtual object such that the first virtual object is configured to be displayed at a first relative location with respect to the first real object, to transmit the updated A/V data to a second electronic device, to analyze the A/V data, and to obtain second personal information of the first real object when the database does not include the first personal information,
wherein the controller is further configured to recognize a shape of a second real object positioned to satisfy a predetermined distance condition with the first real object, and obtain the second personal information based on the recognized shape.

11. The server of claim 10, wherein the controller is configured to recognize a shape of the second real object based on a movement of the first real object.

12. The server of claim 10, wherein the controller is configured to recognize audio data associated with a movement of the first real object and to obtain the second personal information based also on the recognized audio data.

13. The server of claim 10, wherein the controller is configured to generate a second virtual object including the obtained second personal information, to change the A/V data to include the second virtual object, and to transmit the changed A/V data to the second electronic device.

14. A method of controlling an electronic device, the method comprising:
displaying video data of audio/video data (A/V data) streamed from a first electronic device;
obtaining shape feature information of a first real object included in the video data;
determining whether there is first personal information of the first real object based on the shape feature information;
displaying a first virtual object including the first personal information in association with the first real object when there is the first personal information;
analyzing the A/V data to recognize a shape of a second real object positioned to satisfy a predetermined distance condition with the first real object;
obtaining second personal information of the first real object when there is no first personal information, wherein the second personal information is obtained based on the recognized shape; and
displaying a second virtual object including the second personal information on a display unit in association with the first real object.

15. The electronic device of claim 1, wherein the first virtual object is relocated when a display region corresponding to another real object approaches the first virtual object.

16. The electronic device of claim 1, wherein the first virtual object is relocated when a display region corresponding to the first real object approaches the first virtual object.

* * * * *